(12) United States Patent
Zoppas et al.

(10) Patent No.: US 8,255,370 B1
(45) Date of Patent: *Aug. 28, 2012

(54) METHOD AND APPARATUS FOR DETECTING POLICY VIOLATIONS IN A DATA REPOSITORY HAVING AN ARBITRARY DATA SCHEMA

(75) Inventors: Michel Zoppas, San Francisco, CA (US); Jeremy Hermann, San Francisco, CA (US); Conal O'Raghallaigh, San Francisco, CA (US); Eric Bothwell, San Francisco, CA (US); Alexander Fontana, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,926

(22) Filed: Jun. 24, 2011

Related U.S. Application Data

(63) Continuation of application No. 12/079,630, filed on Mar. 28, 2008, now Pat. No. 7,996,373.

(51) Int. Cl.
*G06F 17/30* (2006.01)
(52) U.S. Cl. .......... 707/694; 707/783; 707/785; 726/26; 726/35
(58) Field of Classification Search .................. 707/694, 707/783, 785, 784, 786; 726/26, 35, 1, 3, 726/14; 709/223, 230
See application file for complete search history.

(56) References Cited

U.S. PATENT DOCUMENTS

| | | | |
|---|---|---|---|
| 4,858,152 A | 8/1989 | Estes |
| 5,212,821 A | 5/1993 | Gorin et al. |
| 5,379,391 A | 1/1995 | Belsan et al. |
| 5,384,892 A | 1/1995 | Strong |
| 5,577,249 A | 11/1996 | Califano |
| 5,796,948 A | 8/1998 | Cohen |
| 5,832,212 A | 11/1998 | Cragun et al. |
| 5,835,722 A | 11/1998 | Bradshaw et al. |
| 5,883,588 A | 3/1999 | Okamura |
| 5,884,033 A | 3/1999 | Duvall et al. |
| 5,889,958 A | 3/1999 | Willens |
| 5,892,905 A | 4/1999 | Brandt et al. |
| 5,958,015 A | 9/1999 | Dascalu |
| 5,960,080 A | 9/1999 | Fahlman et al. |
| 5,996,011 A | 11/1999 | Humes |
| 6,047,283 A | 4/2000 | Braun |

(Continued)

FOREIGN PATENT DOCUMENTS

CA      2 499 508      4/2004

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — Jean M Corrielus
(74) *Attorney, Agent, or Firm* — Lowenstein Sandler PC

(57) ABSTRACT

A method and apparatus for scanning structured data from a data repository having an arbitrary data schema and for applying a policy to the data of the data repository are described. In one embodiment, the structured data is converted to unstructured text data to allow a schema-independent policy to be applied to the text data in order to detect a policy violation in the data repository regardless of the data schema used by the data repository.

18 Claims, 10 Drawing Sheets

U.S. PATENT DOCUMENTS

| | | | |
|---|---|---|---|
| 6,055,538 A | 4/2000 | Kessenich et al. | |
| 6,065,056 A | 5/2000 | Bradshaw et al. | |
| 6,073,142 A | 6/2000 | Geiger et al. | |
| 6,094,689 A | 7/2000 | Embry et al. | |
| 6,125,371 A | 9/2000 | Bohannon et al. | |
| 6,138,168 A | 10/2000 | Kelly et al. | |
| 6,233,618 B1 | 5/2001 | Shannon | |
| 6,256,631 B1 | 7/2001 | Malcolm | |
| 6,266,775 B1 | 7/2001 | Kamba | |
| 6,289,375 B1 | 9/2001 | Knight et al. | |
| 6,314,190 B1 | 11/2001 | Zimmermann | |
| 6,321,224 B1 | 11/2001 | Beall et al. | |
| 6,347,374 B1 | 2/2002 | Drake et al. | |
| 6,360,215 B1 | 3/2002 | Judd et al. | |
| 6,374,241 B1 | 4/2002 | Lamburt | |
| 6,396,513 B1 | 5/2002 | Helfman et al. | |
| 6,442,607 B1 | 8/2002 | Korn et al. | |
| 6,442,686 B1 | 8/2002 | McArdle et al. | |
| 6,453,338 B1 | 9/2002 | Shiono | |
| 6,507,846 B1 | 1/2003 | Consens | |
| 6,539,430 B1 | 3/2003 | Humes | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar | |
| 6,701,314 B1 | 3/2004 | Conover et al. | |
| 6,711,579 B2* | 3/2004 | Balakrishnan | 1/1 |
| 6,714,936 B1 | 3/2004 | Nevin, II | |
| 6,732,087 B1 | 5/2004 | Hughes et al. | |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 | 8/2004 | Valente et al. | |
| 6,829,613 B1 | 12/2004 | Liddy | |
| 6,829,635 B1 | 12/2004 | Townshend | |
| 6,871,284 B2 | 3/2005 | Cooper et al. | |
| 6,941,466 B2 | 9/2005 | Mastrianni et al. | |
| 6,947,985 B2 | 9/2005 | Hegli et al. | |
| 6,965,886 B2 | 11/2005 | Govrin et al. | |
| 6,983,186 B2 | 1/2006 | Navani et al. | |
| 6,996,788 B2 | 2/2006 | Akiba et al. | |
| 7,003,562 B2* | 2/2006 | Mayer | 709/223 |
| 7,114,185 B2 | 9/2006 | Moore et al. | |
| 7,130,885 B2 | 10/2006 | Chandra et al. | |
| 7,146,402 B2 | 12/2006 | Kucherawy | |
| 7,162,738 B2 | 1/2007 | Dickinson, III et al. | |
| 7,191,252 B2 | 3/2007 | Redlich et al. | |
| 7,203,749 B2 | 4/2007 | Hiraga et al. | |
| 7,222,158 B2 | 5/2007 | Wexelblat | |
| 7,237,008 B1 | 6/2007 | Tarbotton et al. | |
| 7,249,175 B1 | 7/2007 | Donaldson | |
| 7,320,004 B1 | 1/2008 | DeLuca et al. | |
| 7,472,114 B1 | 12/2008 | Rowney et al. | |
| 7,516,492 B1 | 4/2009 | Nisbet et al. | |
| 7,523,498 B2 | 4/2009 | Fellenstein et al. | |
| 7,685,626 B2 | 3/2010 | Malcolm | |
| 7,716,240 B2* | 5/2010 | Lim | 707/781 |
| 7,774,363 B2* | 8/2010 | Lim | 707/781 |
| 7,788,235 B1 | 8/2010 | Yeo | |
| 7,877,409 B2* | 1/2011 | Lim | 707/781 |
| 7,996,373 B1* | 8/2011 | Zoppas et al. | 707/694 |
| 7,996,374 B1* | 8/2011 | Jones et al. | 707/694 |
| 2001/0027451 A1 | 10/2001 | Taguchi et al. | |
| 2001/0037324 A1 | 11/2001 | Agrawal et al. | |
| 2002/0010679 A1 | 1/2002 | Felsher | |
| 2002/0069098 A1 | 6/2002 | Schmidt | |
| 2002/0073313 A1 | 6/2002 | Brown et al. | |
| 2002/0093676 A1 | 7/2002 | Parry | |
| 2002/0120586 A1 | 8/2002 | Masaki et al. | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 | 3/2003 | Carter et al. | |
| 2003/0093518 A1 | 5/2003 | Hiraga | |
| 2003/0167402 A1 | 9/2003 | Stolfo et al. | |
| 2004/0039991 A1 | 2/2004 | Hopkins et al. | |
| 2004/0193910 A1 | 9/2004 | Moles | |
| 2004/0225645 A1 | 11/2004 | Rowney et al. | |
| 2005/0027723 A1 | 2/2005 | Jones et al. | |
| 2005/0060537 A1 | 3/2005 | Stamos et al. | |
| 2005/0081121 A1 | 4/2005 | Wedel | |
| 2005/0086252 A1 | 4/2005 | Jones et al. | |
| 2005/0132206 A1 | 6/2005 | Palliyil et al. | |
| 2005/0138110 A1 | 6/2005 | Redlich et al. | |
| 2005/0182765 A1 | 8/2005 | Liddy | |
| 2005/0216771 A1 | 9/2005 | Malcolm | |
| 2005/0257267 A1 | 11/2005 | Williams et al. | |
| 2006/0005247 A1 | 1/2006 | Zhang et al. | |
| 2006/0143459 A1 | 6/2006 | Villaron et al. | |
| 2006/0184549 A1 | 8/2006 | Rowney et al. | |
| 2007/0130255 A1 | 6/2007 | Wolovitz et al. | |
| 2007/0136788 A1 | 6/2007 | Monahan et al. | |
| 2007/0156897 A1 | 7/2007 | Lim | |
| 2007/0300306 A1 | 12/2007 | Hussain | |
| 2008/0066150 A1 | 3/2008 | Lim et al. | |
| 2008/0263626 A1 | 10/2008 | Bainter et al. | |
| 2009/0013399 A1 | 1/2009 | Cottrell et al. | |
| 2009/0037594 A1 | 2/2009 | Sever et al. | |
| 2010/0169970 A1 | 7/2010 | Stolfo et al. | |
| 2010/0251363 A1 | 9/2010 | Todorovic | |
| 2010/0332481 A1 | 12/2010 | Rowney | |

FOREIGN PATENT DOCUMENTS

| | | |
|---|---|---|
| CA | 2 597 083 | 8/2006 |
| GB | 2 343 030 A | 4/2000 |
| GB | 2466367 A | 6/2010 |
| JP | 2002-189643 | 5/2002 |
| JP | 2005-539334 | 12/2005 |
| JP | 2008-171101 | 7/2008 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Technmology/index.en.html, Downloaded Feb. 20, 2008, 2 pages.

Autonomy, Limitations of Other Approaches, http://www.autonomy.com/content/Technology/Limitations_Other_Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

(CISCO) A Report From Ironport Systems , "Data Loss Prevention Best Practices—Managing Sensitive Data in the Enterprise", 2007, 21 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform: Review, http://www.clearwellsystems.com/products/e-discovery-review.php, Downloaded Feb. 20, 2008 2 pages.

Clearwell Systems The Clearwell E-Discovery Platform: Search &Cull-Down, http://www.clearwellsystems.com/products/e-discovery-search-cull.php, Downloaded Feb. 20, 2008 1 page.

Dale, et al., "Programming and Problem Solving with C++," 2002, Jones and Bartlett Publishers, 3rd Edition, pp. 653-662.
Deitel, et al., "C++—How to Program," 2001, Prentice Hall, 3rd Edition, pp. 273-279.
fast, Fast ESP Revitalizing your search experience with intelligent, user-centric search, 2007, Fast Search & Transfer ASA. , 6 pages.
Google, Google Search Appliance, http://www.google.com/enterprise/gsa/, Downloaded, Feb. 20, 2008, 2 pages.
Guidance Software, EnCasee® eDiscovery Suite, http://www.guidancesoftware.com/products/ediscovery_index.aspx, Downloaded Feb. 20, 2008, 2 pages.
Kaufman, et al., "Network Security-Private Communication in a Public World," 1995, Prentice, Hall PTR, p. 80.
Koch, et al., "Oracle8-The Complete Reference," 1997, Osborn McGraw-Hill, pp. 9-7 and 51-62.
Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.
Menezes, et al. "Handbook of Applied Cryptography", 1997, p389.
Oracle Secure Enterprise Search 10G, Mar. 2006, 8 pages.
Oracle8™ Tuning, Release 8.0, Dec. 1997, Oracle®.
GB0921722.5 Search Report dated Mar. 26, 2010, 1 page.
PCT Search Report PCT /US03/30178 dated Mar. 11, 2004, 5 pages.
PCT Search Report PCT /US06/5317 dated Jul. 24, 2006, 5 pages.
Shapiro, William, et al., "How to Manage Persistent State in DRM Systems," Available at https://www.springerlink.com/content/9h0xrubltc9abegw/fulltext.pdf, Published 2002.
White, Ron, "How Computers Work" Que Coporation, 6th Edition, 2002, pp. 12-15 and 304.
Zantaz, Enterprise Archive Solution (EAS) Product family, Datasheet, 4 pages.
Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/247,002 mailed May 21, 2009.
Office Action for U.S. Appl. No. 10/247,002 mailed Dec. 31, 2009.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Jun. 25, 2008.
Notice of Allowance for U.S. Appl. No. 10/431,145 mailed Aug. 20, 2008.
Notice of Allowance for U.S. Appl. No. 10/431,145 mailed Jun. 5, 2009.
Office Action for U.S. Appl. No. 12/490,258 mailed Mar. 31, 2011.
Office Action for U.S. Appl. No. 12/490,258 mailed Dec. 6, 2011.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/607,718 mailed Nov. 14, 2008.
Office Action for U.S. Appl. No. 10/607,718 mailed May 1, 2009.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/607,718 mailed Feb. 3, 2011.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of Allowance for U.S. Appl. No. 10/833,538 mailed Aug. 6, 2008.
Notice of Allowance for U.S. Appl. No. 12/266,545 mailed Mar. 25, 2011.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,982 mailed Jan. 6, 2010.
Office Action for U.S. Appl. No. 12/982,750 mailed Apr. 11, 2011.
Office Action for U.S. Appl. No. 12/982,750 mailed Sep. 7, 2011.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 10/892,615 mailed May 12, 2009.
Office Action for U.S. Appl. No. 10/892,615 mailed Mar. 24, 2010.
Office Action for U.S. Appl. No. 10/892,615 mailed Nov, 16, 2011.
Office Action for U.S. Appl. No. 11/057,988 mailed Aug. 18, 2008.
Office Action for U.S. Appl. No. 11/057,988 mailed Jan. 1, 2009.
Office Action for U.S. Appl. No. 11/057,988 mailed Jul. 10, 2009.
Office Action for U.S. Appl. No. 11/057,988 mailed Mar. 18, 2010.
Office Action for U.S. Appl. No. 11/058,551 mailed Sep. 9, 2008.
Office Action for U.S. Appl. No. 11/058,551 mailed Mar. 20, 2009.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 8, 2010.
Office Action for U.S. Appl. No. 11/058,551 mailed Apr. 11, 2011.
Office Action for U.S. Appl. No. 12/079,719 mailed Jan. 21, 2011.
Office Action for U.S. Appl. No. 12/179,630 mailed Aug. 31, 2010.
Notice of Allowance Action for U.S. Appl. No. 12/179,630 mailed Mar. 24, 2011.
Office Action for U.S. Appl. No. 12/079,660 mailed Dec. 22, 2010.
Office Action for U.S. Appl. No. 12/342,038 mailed May 3, 2011.
Office Action for U.S. Appl. No. 12/395,554 mailed Nov. 23, 2011.
Office Action for U.S. Appl. No. 12/410,432 mailed Jul. 29, 2011.

* cited by examiner

METHOD AND APPARATUS FOR DETECTING POLICY VIOLATIONS IN A DATA REPOSITORY HAVING AN ARBITRARY DATA SCHEMA

RELATED APPLICATIONS

This application is a continuation of U.S. patent application Ser. No. 12/079,630, now U.S. Pat. No. 7,996,373, filed Mar. 28, 2008, which is incorporated herein by reference.

TECHNICAL FIELD

Embodiments of the invention relate to the field of processing data; more specifically, to detecting policy violations in a data repository having an arbitrary data schema.

BACKGROUND

A modern organization typically maintains a data storage system to store and deliver records concerning various significant business aspects of the organization. Stored records may include data on customers (or patients), contracts, deliveries, supplies, employees, manufacturing, or the like. A data storage system of an organization usually utilizes a table-based storage mechanism, such as relational databases, client/server applications built on top of relational databases (e.g., Siebel, SAP, or the like), object-oriented databases, object-relational databases, document stores and file systems that store table formatted data (e.g., CSV files, Excel spreadsheet files, or the like), password systems, single-sign-on systems, or the like.

Table-based storage systems typically run on a computer connected to a local area network (LAN). This computer is usually made accessible to the Internet via a firewall, router, or other packet switching devices. Although the connectivity of a table-based storage system to the network provides for more efficient utilization of information maintained by the table-based storage system, it also poses security problems due to the highly sensitive nature of this information. In particular, because access to the contents of the table-based storage system is essential to the job function of many employees in the organization, there are many possible points of possible theft or accidental distribution of this information. Theft of information represents a significant business risk both in terms of the value of the intellectual property as well as the legal liabilities related to regulatory compliance. Various search mechanisms have been used to detect theft of sensitive information, such as relational database search techniques, information retrieval techniques, file shingling techniques, and Internet Content Filtering Techniques, which are known by those of ordinary skill in the art.

Also, as the volume of data continues to grow within organizations, data security personnel have little or no visibility into where sensitive information, such as confidential data, is stored across the enterprise. There are three fundamental challenges surrounding stored data: 1) quickly finding exposed confidential data wherever it is stored, 2) understanding who has unauthorized access to that data, and 3) fixing the exposed confidential data automatically or manually.

Sensitive information, such as confidential data, can be stored in a variety of data repositories maintained by different application systems such as Oracle® Relational Database Management System (RDBMS), Structured Query Language (SQL) servers, Lotus Domino® servers, Microsoft® exchange servers, Microsoft® SharePoint servers, etc. These different application systems store the confidential data as structured data in a data repository (also referred to as a data store) according to different data schemas. For example, in a relational database, the data schema defines the tables, the fields in each table, and the relationships between fields and tables.

In order to prevent malicious and unintentional data breaches, commercial and government regulations often impose restrictions on how confidential data may be stored, the format of confidential data, and who can access that confidential data. In order to comply with these regulations, companies create policies to govern how confidential data is stored in the various applications, in what format the confidential information is stored, and who can access that confidential data. However, since the confidential data is stored according to various types of data schemas, the policies cannot be generally applied to all of the different types of data repositories, but need to be customized, and individually applied to each of the different types of data repositories. Also, since the confidential data is stored according to a specific data schema, in order to search the data repository for confidential data, the conventional systems require specific knowledge of which data schema the particular data repository uses to store the data before searching or indexing the content of the data repository.

There are various conventional methods and systems that can scan and search different types of application data repositories for text data, such as e-Discovery tools and enterprise search tools. The enterprise search tools typically do not apply policies to data at all, but are primarily used to retrieve documents based on simple legacy keyword searches or highly sophisticated conceptual querying. The e-Discovery tools typically allow an organization to search, identify, cull, collect, and process electronically stored information (ESI) across the organization, and then export the ESI to an attorney review platform. The e-Discovery tools can process documents according to specified policies to help manage and identify data for legal, regulatory, and investigative matters. However, the e-Discovery tools require specific knowledge of the particular data schema used by each of the data repositories in order to search, index, or retrieve the data. In addition, the e-Discovery tools are not directed at applying policies to stored data in order to detect policy violations in the stored data, but rather to searching, indexing, or retrieving specific data for legal, regulatory, and investigative review on another platform.

SUMMARY

A method and apparatus for scanning structured data from a data repository having an arbitrary data schema, and converting the structured data into text data to allow a schema-independent policy to be applied to the text data in order to detect a policy violation in the data repository regardless of the arbitrary data schema of the structured data. In one embodiment, a data loss prevention policy is applied to the converted text data to detect confidential data stored in the data repository.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
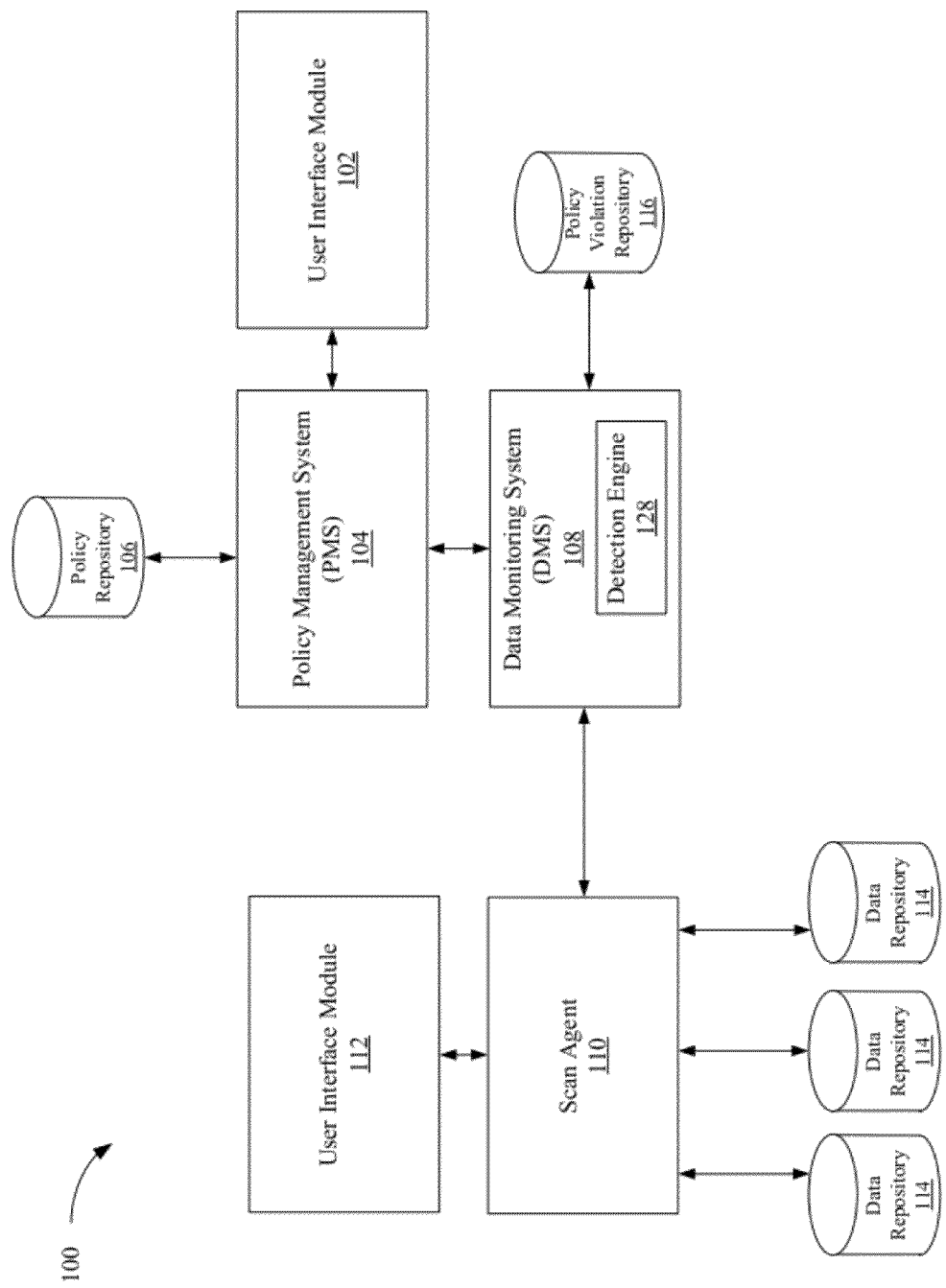
FIG. 1 is a block diagram of one embodiment of a system for detecting policy violations in a data repository having an arbitrary data schema.

Methods and apparatuses are described for scanning structured data from a data repository having an arbitrary data schema and applying a policy to the structured data of the data repository. In one embodiment, the structured data is converted to unstructured text data to allow a schema-independent policy to be applied to the text data in order to detect a policy violation in the data repository regardless of the data schema used by the data repository. The schema-independent policy may be a data loss prevention policy directed to detecting confidential information that is stored in the data repository. Applying the data loss prevention policy to the converted text, instead of the structured data, allows the detection of confidential information that is otherwise hidden in the data repository due to the data schema of the data repository. For example, the confidential data may be a Social Security number. However, instead of being stored in a column labeled "Social Security numbers" or "SSN", the Social Security number may be included in an email message stored on a data repository managed by a server (e.g., Microsoft® exchange server).

In some embodiments, data is read from the application data repository in logical units of data. Some logical units may include metadata. For example, in SQL databases, the logical unit of data is an individual row of a table in the database along with metadata describing the row (e.g., table name). In another example, in Lotus Notes® databases, the logical unit of data is individual documents along with the documents associated items (e.g., metadata). Data governance policies may be applied to each logical unit read from an application data repository.

As discussed above, scanning of repository data is performed in a schema-agnostic manner, meaning the schema of a particular data repository does not need to be known. Regardless of the original format of the repository data or metadata, data governance policies may be applied to unstructured text of each logical unit of data of the data repository. As a result, confidential data may be detected regardless of where it is being stored or used, and regardless of the particular structure of the repository data. Confidential data may include, for example, personally identifiable information (PII) (which may expose identities of patients or customers), intellectual property (e.g., design documents, source code, customer lists, or the like), corporate data such as sensitive marketing plans and financial statements, previously classified data and documents, and other sensitive data, whether it is located on servers, desktops and laptops, copied to removable storage devices, such as Universal Serial Bus (USB) drives, CD-ROMs, or the like, or downloaded to local drives. Once the exposed confidential information is detected, various remediation techniques can be used to prevent loss of the confidential information (e.g., across endpoint, network, and storage systems).

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram formats in order to avoid unnecessarily obscuring the present invention. Thus, the specific details set forth are merely exemplary. Particular implementations may vary from these exemplary details and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment of a system 100 for detecting policy violations in a data repository having an arbitrary data schema. The system 100 may be implemented in a centralized configuration, or alternatively, in distributed computing environments. The system 100 may include a user interface module 102, a policy management system (PMS) 104, a policy repository 106, a data monitoring system (DMS) 108, a scan agent 110, a user interface module 112, data repositories 114, and a policy violation repository 116.

The scan agent 110 is responsible for scanning data stored in the data repositories 114. Data repositories 114 may be managed by any application system, including, for example, Oracle® Relational Database Management System (RDBMS), a file server, a web server, a workstation (e.g., desktop, laptop, or the like), Lotus Domino® server (e.g., Lotus Notes® database), Microsoft SharePoint® server, Documentum® content server, LiveLink® server, Microsoft® exchange server, SQL server, etc. In particular, the scan agent 110 scans the stored data to detect exposed confidential data. The scan agent 110 is configured to access data stored in a data repository 114 which stores data using an arbitrary data schema. The scan agent 110 is configured to derive the arbitrary data schema of the data repository 114, and to scan the data of the data repository 114 according to the derived data schema. In one embodiment, as part of the scan, the scan agent 110 converts the data from structured data into unstructured text data to allow a schema-independent policy to be applied to the data of the data repository 114 in order to detect a policy violation in the data repository 114 regardless of the arbitrary data schema of the structured data. That is, the scan agent 110 can scan any data repository 114 without previously knowing the data schema used by the data repository 114 to store the data.

The data repository 114 may be a file server (e.g., Windows via CIFS, UNIX via NFS, Local Windows, Local UNIX (e.g., Linux, AIX, Solaris), Novel, NAS filers, or the like), document and email repositories (e.g., managed by Microsoft SharePoint®, Lotus Notus®, Documentum®, LiveLink®, Microsoft® exchange servers, or the like), web site data stores (e.g., employee intranets and partner extranets), relational databases (e.g., Oracle®, Microsoft® SQLServer, IMB® DB2, Sybase® databases), file systems on a workstation (e.g., desktop or laptop), or the like.

In one embodiment, the scan agent 110 resides on a server or a workstation and connects to the data repositories 114 over a computer network that communicates via any of the standard protocols for the exchange of information. Alternatively, the scan agent 110 can reside on the machine that manages the particular data repository.

In one embodiment, the scan agent 110 queries the data repository 114 to derive the arbitrary data schema, if not previously known, and reads data from the data repository 114 according to the derived data schema. In another embodiment, the scan agent 110 analyzes the arbitrary data schema to determine logical units of data of the data repository (e.g., rows, documents, or the like). Next, the scan agent 110 reads the structured data by the logical units of data and sends the read data to the detection engine 128 of the DMS 108 to detect whether the data repository violates a policy, such as a policy pertaining to storing exposed confidential data in the data repository. In one embodiment, the scan agent 110 reads the structured data by the logical units of data and generates a message containing the converted text data that is read from the data repository by the logical units of data. In other words, each message may represent a single logical unit of data extracted from the data repository. Alternatively, the structured data may be read, converted, and sent to the detection engine 128 in a different form. For example, the converted data may be inserted into a file that is sent to the detection engine 128. It should be noted that messages, as used herein, unless specifically referring to email messages, refer to the data extracted from the data repositories as part of a scan of the data repository.

In one embodiment, the scan agent 110 receives user input regarding the location of the data repository 114 to be scanned through the user interface module 112. The user input may include the location of the data repositories and how to connect to the data repositories, such as a connect string, vender information about the particular data repository 114 (e.g., protocol used by depository), and/or credential information for the particular data repository 114, as well as other scanning parameters. The connect string includes information about how to connect to a particular data repository 114. The vender information may include information about the type of data repository, such as information that indicates that the data repository is managed by a relational database management system (e.g., Oracle® RDBMS), protocol information that indicates how to access and read data from the particular data repository, or the like. The credential information for the particular data repository 114 includes information that allows the scan agent 110 to access the particular data repository 114, such as a username and password or other authentication information. In another embodiment, the user input includes optional queries (e.g., SQL queries) for querying specific information from the data repository, such as specific table names in a database. Alternatively, the user input may include other information, such as a specified number of rows to be read from any particular table of the database, parameters to modify how the data repository is scanned or what type of data should be scanned, or the like.

In another embodiment, the scan agent 110 includes scan management options that can be pre-defined or modified by the user through the user interface module 112. The scan management options may be used to reduce impact on network bandwidth. For example, the scan management options may be configured to schedule how often the scan agent 110 scans one or more data repositories 114, which data repositories 114 are to be scanned, whether the scanning is scheduled or incremental scanning, to allow for scan throttling, whether to scan machines that are offline, or the like. In another embodiment, multiple scan agents 110 are implemented at different locations to provide scalability and/or protect multiple possible points of egress of information, as well as multiple points of data storage. In another embodiment, multiple scan agents 110 are used for parallel scanning of one or more data repositories 114.

The DMS 108 is responsible for detecting policy violations in the data extracted from the data repositories 114 and converted by the scan agent 110. The DMS 108 receives one or more policies from the PMS 104, and detects violations of the abovementioned policies in the data repositories 114. The DMS 108 includes the detection engine 128, which detects policy violations according to a specified policy. For example, the DMS 108 may check messages sent from the scan agent 110 containing the data from the repositories 114 (e.g., data repositories of servers, workstations (e.g., personal computing devices such as portable computers, desktop computers, Personal Digital Assistants (PDA), cell-phones, or the like), and various databases.

The detection engine 128 may detect policy violations in the repository data using various search techniques. Exemplary search techniques are referred to herein as Described Content Matching (DCM), Exact Data Matching (EDM), and Index Data Matching (IDM). DCM searches the repository data for specific content (e.g., keywords, data identifiers, regular expressions, etc,) described in the policy. EDM is used to search the repository data for content included in a different database identified in the policy. For example, the policy may require that data from the Microsoft® Exchange repository be searched for any content stored in the Human Resources database of the organization. IDM is used to search the repository data for content included in sensitive documents (e.g., proprietary software code) or the sensitive documents themselves, which are identified in the policy. It should be noted that various other search techniques known by those of ordinary skill in the art can be used by the detection engine 128 to detect policy violations in the repository data. The detection engine 128 may be configured to analyze both content and context of the data.

In the embodiments where messages are used to send the converted data to the detection engine 128 to detect policy violations, the DMS 108 receives the messages from the scan agent 110 and detects whether any of the messages violate a policy. In one embodiment, the DMS 108 is responsible for evaluating detected violations, determining which actions to perform for each detected violation based on the action conditions, and performing the identified actions. Also, the DMS 108 may store the policy violations in a policy violation data repository when detected by the DMS 108. In one embodiment, multiple DMSs 108 are implemented at different locations to provide scalability and/or protect multiple possible points of egress of information.

The PMS 104 is responsible for receiving input pertaining to a policy and defining the policy based on the input. A policy may be a data loss prevention policy directed to detecting confidential information stored in one or more data repositories 114. The policy is schema-independent, meaning that the policy requestor (e.g., a user or a program providing policy parameters to the PMS 104) does not need to know the format and the data types used to store the data in the data repository 114, and/or to specify the data schema of the data repository 114. The PMS 104 may receive input pertaining to a policy from a user interface module 102 that facilitates user input pertaining to policies via a user interface. Alternatively, the PMS 104 receives the policy parameters and/or actions from an Application Programming Interface (API) or via a configuration file formatted in text or a defined data format (e.g., extensible markup language (XML) or binary format).

In one embodiment, a user interface may allow a user to choose a pre-configured policy template for a policy. The policy repository 106 stores policy templates configured based on regulations concerning handling of sensitive information maintained by an organization. These regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. The policy repository 106 may also (or instead) store customized policy templates configured based on corporate data governance rules. In one embodiment, a template includes a set of clauses (also referred to herein as rules) that specify conditions triggering a policy violation. The clauses may be composed using logical connectives of first-order logic (e.g., AND, OR, NAND, NOR, NOT, equivalent, nonequivalent, or the like). Alternatively, if a user decides not to use a template, a user interface may allow the user to provide parameters for each rule of the policy, as well as logical connectives between the rules. In another embodiment, the user can modify an existing policy template stored in the policy repository 106. The PMS 104 may also be responsible for defining which actions should be taken when a certain type of violation is detected (e.g., reporting detection of confidential information in data repository 114, removing confidential information from data repository 114, restricting access to confidential information, or the like).

In one embodiment (not shown), the user interface module 112 and the user interface module 102 are implemented as a single user interface module that provides a user interface facilitating user input of policy parameters, user input of action conditions, and user input regarding the database to be scanned, the location of the database to be scanned, scanning parameters, or the like.

In one embodiment, the PMS 104, the DMS 108, and the scan agent 110 are coupled to a computer network and communicate via any of the standard protocols for the exchange of information. In one embodiment, the three subsystems (PMS 104, DMS 108, and scan agent 110) run on one Local Area Network (LAN). However, the PMS 104, DMS 108, and scan agent 110 may be incorporated into the same physical or logical system. In another embodiment, the PMS 104, DMS 108, and scan agent 110 may not necessarily reside on the same LAN. The PMS 104 may reside on the same LAN as the data repositories 114, but the DMS 108 may reside on a different LAN which is separated from the LAN on which PMS 104 resides. In this configuration, the two distinct LANs may ultimately be coupled together via the Internet but separated by firewalls, routers, and/or other network devices. This is an advantageous configuration for the case where a company specifically wants to restrict another company that needs their database data (such as a law firm or marketing agency) from violating the first company's database data policy.

By monitoring content residing in data repositories 114, the embodiments described herein are able to detect user operations that may involve a potential misuse of data (e.g., saving or accessing restricted data on any storage device on the computing system, using restricted data in an application, printing restricted data, using restricted data in any network communication protocol, or the like). In this configuration, the PMS 104 component of the system 100 may reside on a server and the DMS 108 component of the system 100 may reside on a device coupled to the server via a public network (e.g., the Internet) or a private network (e.g., LAN). Alternatively, the system 100 may be implemented in other configurations, such as hosted configurations, distributed configurations, centralized configurations, or the like.

Although FIG. 1 is shown to include the above components, these components are not necessary for performing the embodiments described herein. One possible benefit of using the system 100 described herein, is that the DMS 108 can not only monitor incoming messages from the scan agent 110 that include data from the data repositories 114, but can also monitor incoming and outgoing messages, such as email messages transmitted within an organization's LAN or outside of the organization's LAN, for example.

Figure 2:
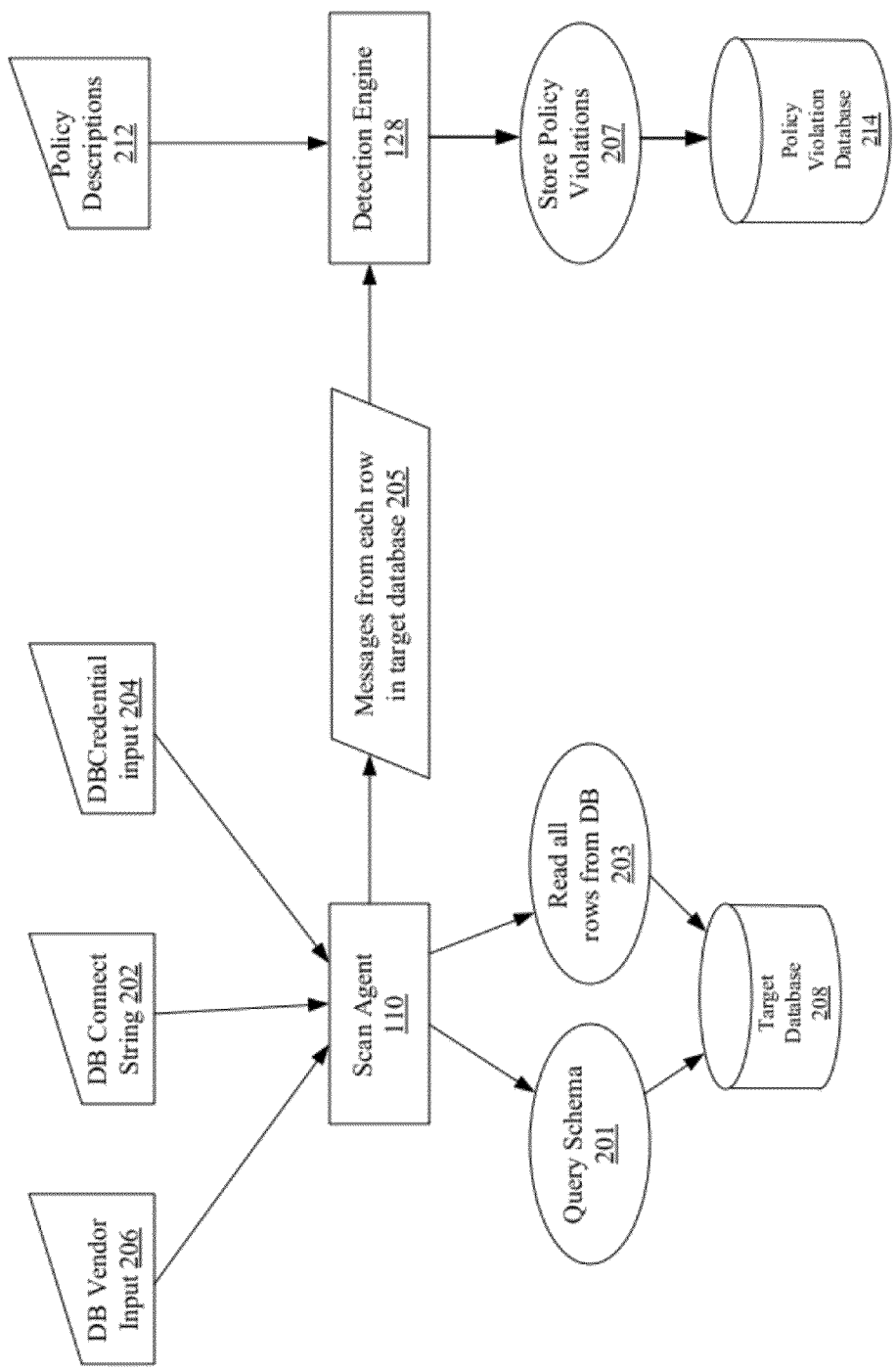
FIG. 2 is a component interaction diagram of one embodiment of the system of FIG. 1 for detecting policy violations in a target database having an arbitrary schema.

FIG. 2 is a component interaction diagram of one embodiment of the system 100 of FIG. 1 for detecting policy violations in a target database 208 having an arbitrary data schema. The scan agent 110 may receive various scanning parameters including, for example, database connect string 202, database credential input 204, database vendor input 206, and/or other types of scanning parameters such as specific queries from the user to customize the scan (e.g., a SQL query for querying the table names in the database), a parameter that indicates the maximum number of rows to be read from any table, or the like.

Once the scan agent 110 receives the scanning parameters, the scan agent 110 connects to the target database 208 using, for example, the database connect string 202. Once the scan agent 110 is connected to the target database 208, the scan agent 110 queries the data schema of the target database 208, operation 201. The scan agent 110 queries the data schema to derive the arbitrary schema of the target database 208 when the scan agent 110 does not know the particular data schema being used by the target database 208. In one embodiment, the scan agent 110 queries the target database 208 to determine logical units of data of the target database 208 in order to read the structured data by the logical units of data. In the embodiment, the scan agent 110 queries the target database 208, which stores the structured data in a tabular format, to determine a set of table names of the target database 208. For each table in the target database 208, the scan agent 110 reads the column names of the table, and identifies each cell in the target database 208 as one of text, numbers, or binary data. When the scan agent 110 already knows the particular data schema, these operations may not be performed. Once the scan agent 110 knows the particular data schema, scan agent 110 reads the data from the target database according to the derived data schema (e.g., rows of the identified tables). In the depicted embodiment, once the data schema is known, for each row in the table, the scan agent 110 reads all cells in that particular row, operation 203.

Once each of the cells of the row has been identified as being text, numeric, or binary data, the scan agent 110 converts the data of the cells into unstructured text data to allow a schema-independent policy to be applied to the unstructured text data to detect a policy violation in the target database 208. For example, in a particular row, one of the cells contains text, such as a name, and another cell contains a number, such as social security number. After reading the row from the target database 208, the scan agent 110 converts the structured data of each of the cells to unstructured text. Since the one cell already contains text, this text may be merely copied into the text block of the message. The other cell, however, contains a number which is converted into a text representation of the number. In another embodiment, the row may contain binary data in one or more of the cells. The binary data may be, for example, a Zip file, a computer-aided design (CAD) diagram, a PDF document, or the like. The binary data is converted to unstructured text data and remains associated with the logical unit of data (e.g., row). In one embodiment, the binary data is converted to unstructured text by the scan agent 110 and either attached to the message as a text file or included in the body of the message. In another embodiment, the binary data is attached to the message as an attachment which is later converted by the detection engine 128. The binary data may be converted by identifying whether portions of the binary data contain characters and numbers, and converting the numbers to text representations of the numbers. In this embodiment, each row in each of the tables is treated as a logical unit of data. Alternatively, the logical unit of data may be defined otherwise, such as a logical unit of data being a single document.

Once the structured data of the target database 208 has been read and converted into unstructured text, the scan agent 110 generates a message containing the converted text data. This message may be sent to a detection engine (e.g., detection engine 128 of DMS 108) to detect whether the message violates a policy, for example, by applying the schema-independent policy to the converted text data of the message. In another embodiment, the message may be stored in memory to be retrieved later by the detection engine 128.

In the depicted embodiment, the detection engine 128 receives user input concerning the policy, such as policy descriptions 212, for example, to pertain to the rules of a particular policy, and applies the policy to the messages received from the scan agent 110. Once the detection engine 128 detects a policy violation, the detection engine 128 stores the policy violation in the policy violation database 214, operation 207. The policy violations may be stored in the policy violation database 214 for later retrieval by an administrator to analyze the policy violation and possibly remediate the policy violation.

Figure 3A:
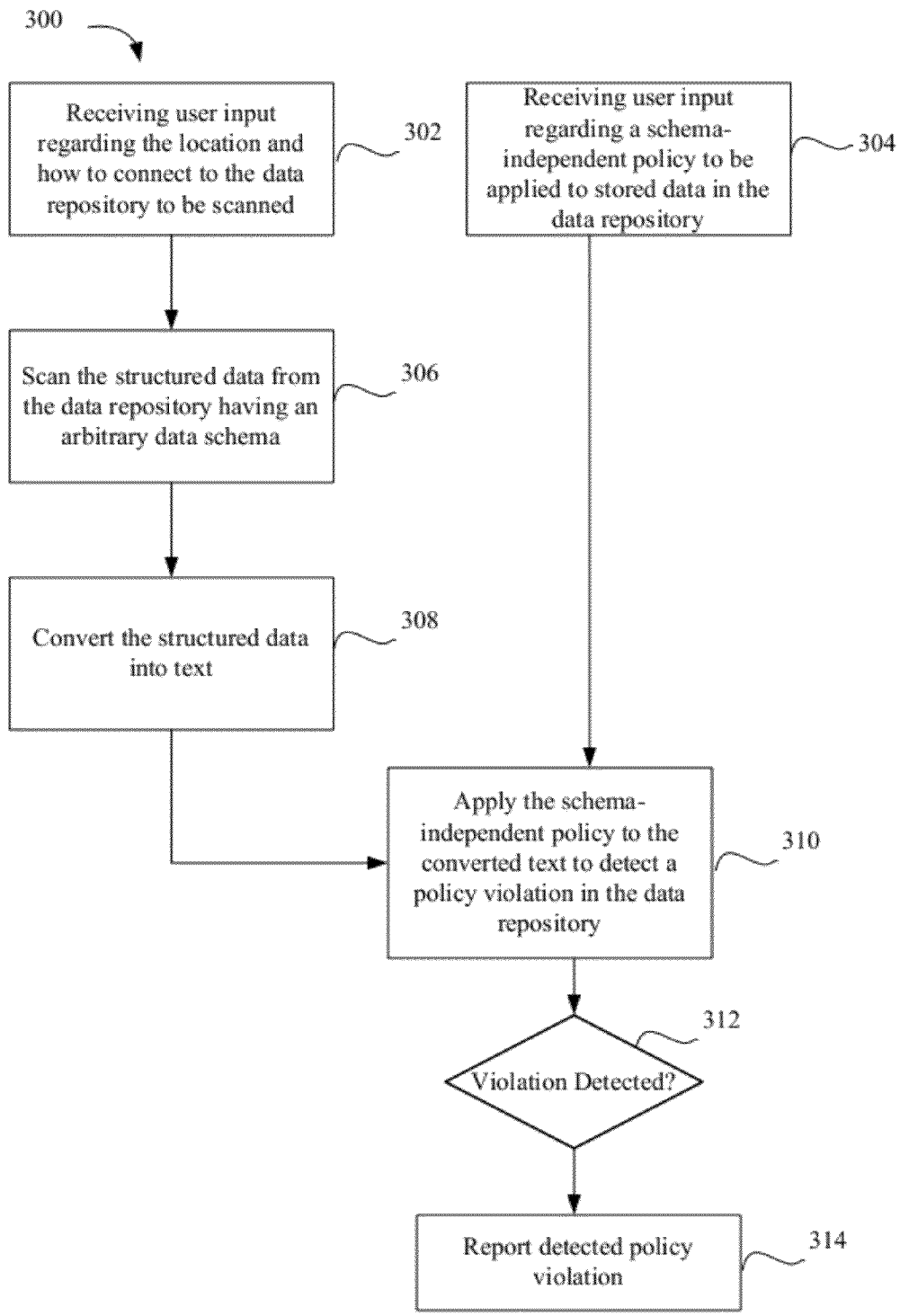
FIG. 3A is a flow diagram of one embodiment of a method for applying a schema-independent policy to data stored in a data repository having an arbitrary data schema.

FIG. 3A is a flow diagram of one embodiment of a method 300 for applying a schema-independent policy to data stored in a data repository having an arbitrary data schema. The method is performed by processing logic that may comprise hardware (circuitry, dedicated logic, or the like), software (such as is run on a general purpose computer system or a dedicated machine), or a combination of both. In one embodiment, method 300 is performed by a policy violation detection system (e.g., system 100 of FIG. 1).

Processing logic begins by receiving user input regarding the location and how to connect to the data repository to be scanned (block 302). The processing logic also receives user input regarding a schema-independent policy (e.g., data loss prevention policy) associated with the data repository (block 304). Next, processing logic scans the structured data from the data repository having an arbitrary data schema (block 306), and converts the structured text data into unstructured text data (block 308). One embodiment of a method for scanning a data repository and converting its contents will be discussed in more detail below in conjunction with FIG. 3B. Once the data is converted, the processing logic applies the schema-independent policy to the converted text data to detect the policy violation in the data repository (block 310).

Upon detecting a policy violation (block 312), processing logic reports the violation (block 314). In one embodiment, processing logic reports the violation by specifying the fragments of the content that triggered the policy violation. In another embodiment, the processing logic reports the violation by identifying a location of the structured data that triggered the policy violation. Alternatively, the processing logic may report the policy violation in other manners, such as storing the policy violation in a designated data store for later retrieval and review by a user.

Figure 3B:
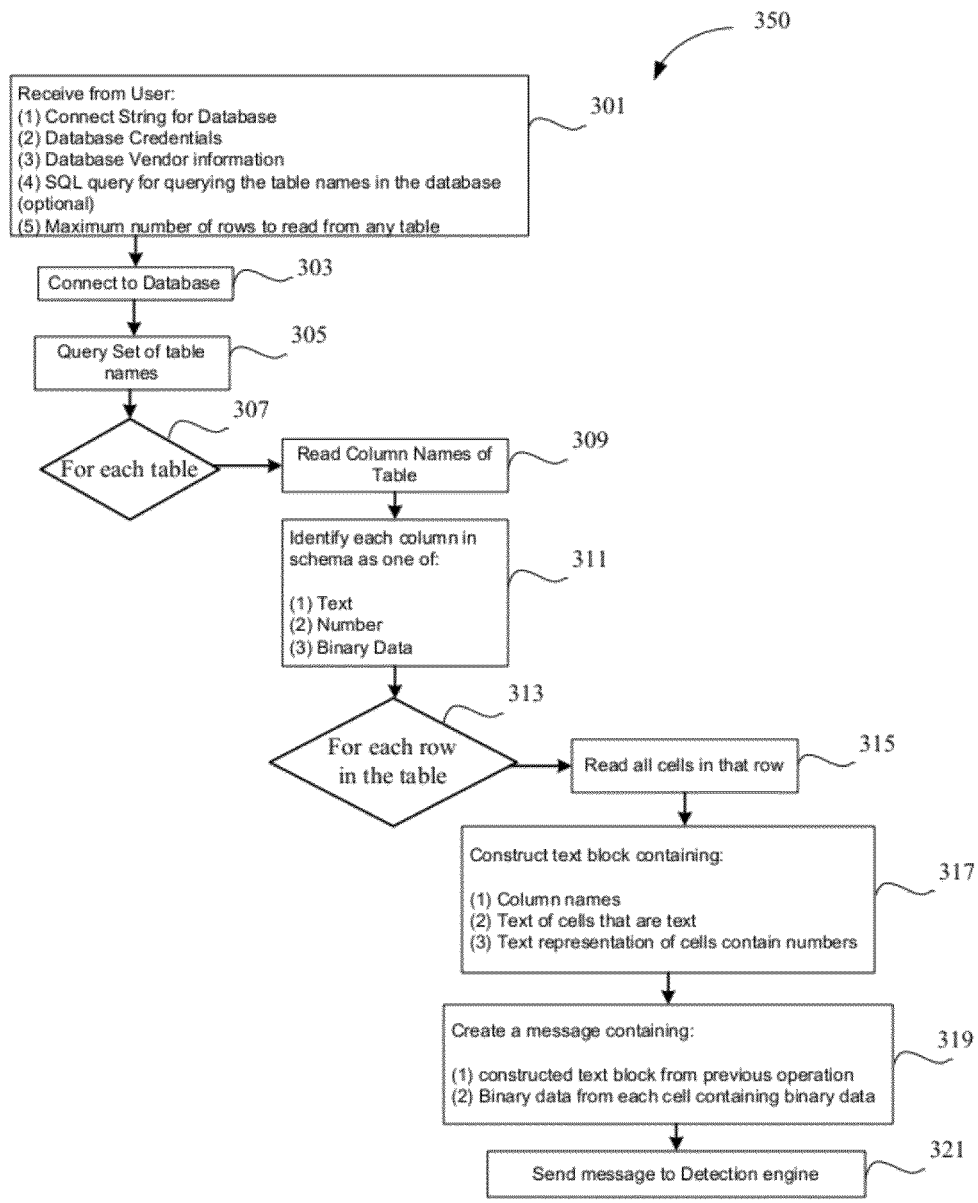
FIG. 3B is a flow diagram of another embodiment of a method for scanning a data repository having an arbitrary data schema.

FIG. 3B is a flow diagram of another embodiment of a method 350 for scanning a data repository having an arbitrary data schema. The method is performed by processing logic that may comprise hardware (circuitry, dedicated logic, or the like), software (such as is run on a general purpose computer system or a dedicated machine), or a combination of both. In one embodiment, method 300 is performed by a scan agent (e.g., scan agent 110 of FIG. 1).

Processing logic begins by receiving user input from a user (block 301). In the depicted embodiment, the user input includes a connect string for the database, database credentials, and database vender information. In another embodiment, the user input may also optionally include a SQL query for querying the table names in the database and a maximum number of rows to be read from any table. Next, processing logic connects to the database using the user input (block 303), and queries a set of table names contained in the database (block 305). Next, the processing logic performs various operations for each table identified in the database (block 307). In particular, the processing logic reads the column names of the table (block 309), and identifies (block 311) each column in the schema as one of: (1) text, (2) numbers, or (3) binary data. Alternatively, the processing logic may obtain additional information about the database, such as the users associated with the particular table, or the like. By querying the set of table names, reading the column names of each of the tables, and identifying each column in the schema as text, numbers, or binary data, the processing logic derives the data schema of the data repository. One embodiment of a method for converting a database row to unstructured text will be discussed in more detail below in conjunction with FIG. 3C.

Alternatively, if the data repository has a non-tabular structure, the processing logic may query the data repository to identify the logical units of data of the particular data schema in order to derive the arbitrary data schema. For example, in a tree structured or hierarchical structured data repository, the data is stored in an inverse tree structure that has one node which is the topmost node, called the root node, and one or more branches to one or more additional nodes. A node may contain a value or a condition that represents a separate data structure or a tree of its own. Each node in a tree has zero or more children nodes, which are below it in the tree (by convention). In this embodiment, the processing logic queries the root node to list the names of any children nodes branching from the root node. Next, the processing logic queries each of the nodes to identify the type of data that is stored in each of the nodes and/or if the node branches to any other nodes. By querying the nodes, and identifying the type of data that is stored at each of the nodes, the processing logic derives the arbitrary data schema of the tree structured or hierarchical structured data repository. Alternatively, the processing logic may derive the data schema of other types of structured data repositories without previously knowing the particular data schema being used.

In the depicted embodiment, after the processing logic has queried the set of table names, read the column names of each table, and identified each column in the schema as one of text, number, or binary data, the processing logic performs various operations for each row in the table (block 313), namely the processing logic reads all cells in that row (block 315), and constructs a text block containing: (1) the column names, (2) text of cells that contain text data, and (3) text representations of cells that contain numbers (block 317). Next, the processing logic creates a message containing: (1) the constructed text block from the previous operation, and (2) the binary data from any cell containing binary data (block 319), if any. In one embodiment, the processing logic attaches the binary data as an attachment to the message. In another embodiment, the processing logic converts the binary data to unstructured text and attaches it to the message as an attachment. Alternatively, the binary data is converted to unstructured text data and inserted into the message. Next, the processing logic sends the message to the detection engine (block 321) so that the detection engine can detect whether the message violates one or more specified policies, which are applied to the message.

Figure 3C:
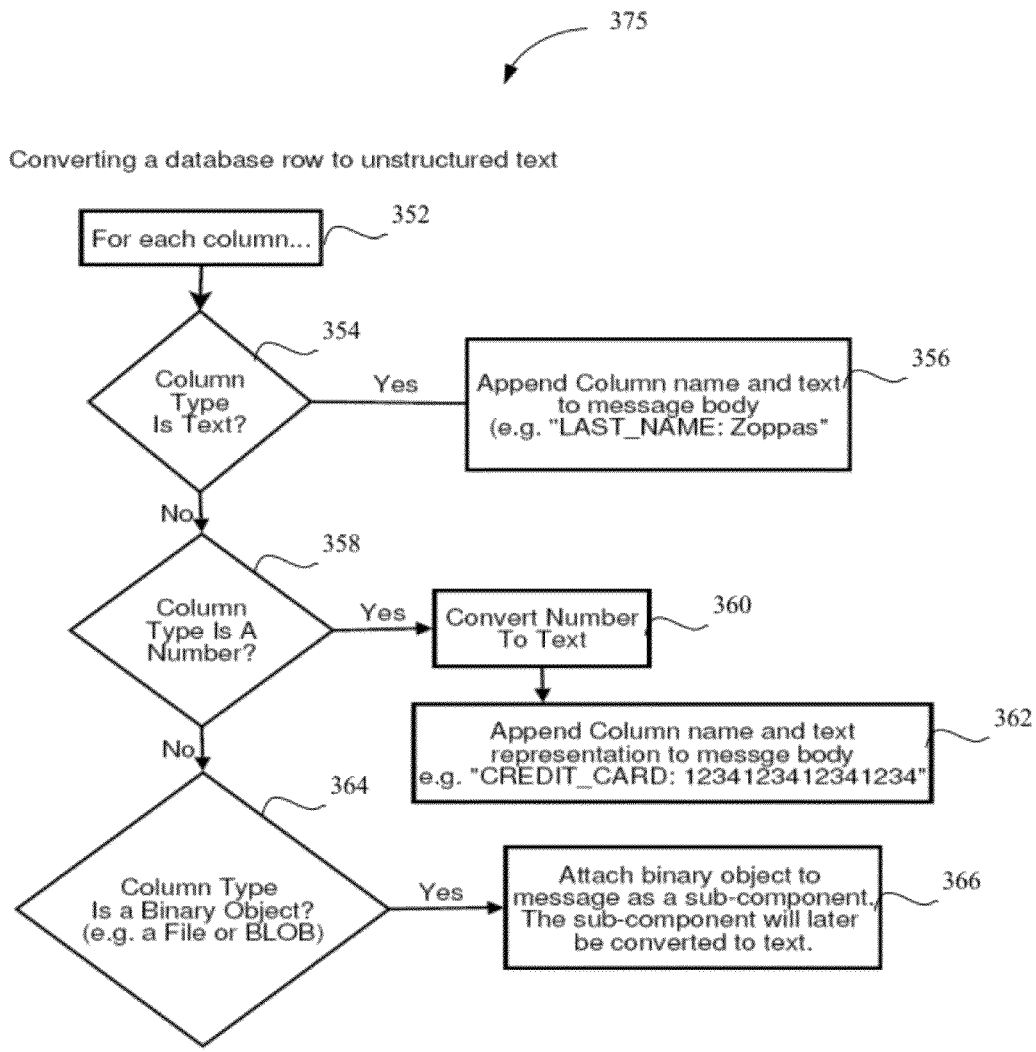
FIG. 3C is a flow diagram of one embodiment of a method for converting a database row to unstructured text.

FIG. 3C is a flow diagram of one embodiment of a method 375 for converting a database row to unstructured text. The process is performed by processing logic that may comprise hardware (circuitry, dedicated logic, or the like), software (such as is run on a general purpose computer system or a dedicated machine), or a combination of both. In one embodiment, method 300 is performed by a scan agent (e.g., scan agent 110 of FIG. 1).

After the processing logic has read the column names of the table (block 309) as described above with respect to FIG. 3B, the processing logic performs various operations for each column identified in the database. In particular, the processing logic determines whether the column type is text (block 354), whether the column type is a number (block 358), pr whether the column type is a binary object (e.g., a file or binary large object (BLOB), which is a collection of binary data stored as a single entity in a database management system). If the column type is text, the processing logic appends the column name and the text to the message body (block 356) (e.g., "LAST_NAME: Zoppas"). If the column type is a number, the processing logic converts the number to text representation of the number, and appends the column name and the text representation of the number to the message body (block 362) (e.g., "CREDIT_CARD: 1234123412341234"). If the column type is a binary object, the processing logic attaches the binary object to the message as a sub-component (block 366). In another embodiment, the processing logic converts the binary object to unstructured text and appends the converted text to the message body. Alternatively, the processing logic may convert the binary object to unstructured text and append the converted text as a text file attachment of the message.

Although the embodiments described with respect to FIGS. 3B and 3C are directed to scanning a database having tables, alternatively, other types of data repositories may be scanned.

Figure 4:
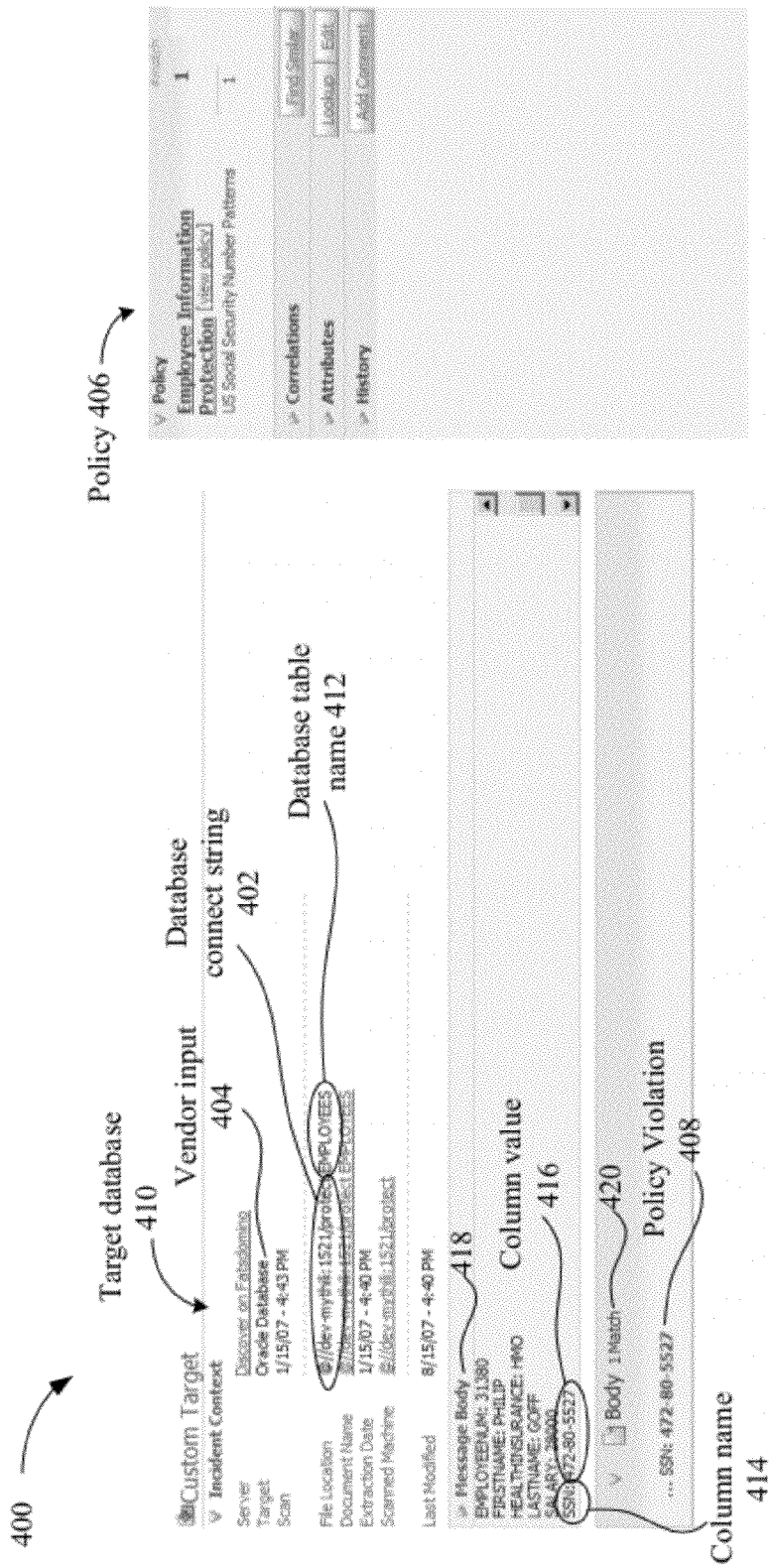
FIG. 4 is an exemplary graphical user interface that illustrates a policy violation detected in a target database, in accordance with one embodiment.

FIG. 4 is an exemplary graphical user interface (GUI) 400 that illustrates a policy violation detected in a target database, in accordance with one embodiment. The GUI 400 identifies a policy 406 used for a target database 410, a database connect string 402 which indicates how to connect to the target database (e.g., @//dev-mythili:1521/protect), the vendor information 404 (e.g., Oracle® database), and the server on which the target database 410 resides (e.g., "Discover on Fatsdomino"). The above information was received as part of user input for scanning the target database 410. The GUI 400 also displays the results of the scan. In particular, the GUI 400 displays database table name 412 and the column name 414 in which the policy violation 408 was detected. In addition, the GUI 400 may display the column value 416 that triggered the policy violation 408, the message body 418, and a portion 420 of the body of the message that includes the policy violation 408. The GUI 400 may also highlight the policy violation 408 with the portion 420 of the body. Alternatively, the policy violation 408 may be displayed in other ways. The GUI 400 may further display the date and time of the scan, and/or other parameters.

Embodiments of detecting policy violations will now be discussed in more detail. In one embodiment, when the detection engine 128 receives the converted text (e.g., in the form of a message, file, or the like) from the scan agent 110, the detection engine 128 determines the message or file type, and breaks the message or file into components, such as header, body, and attachment. The detection engine 128 analyzes the incoming text of the header and body, and possibly converts the attachment, if not already converted, to check if the message or file meets user-specified conditions as defined by one or more policies, and applies one or more policies to the converted text to detect any policy violations (i.e., detect whether the converted text includes confidential information). The message or file may be stored in a message buffer to be read by the detection engine 128. In one embodiment, as part of analyzing the incoming message or file, the detection engine 128 decodes the message or file into message sub-components, such as a header (e.g., name-value pair or title), a body, and an attachment. The detection engine 128 may apply the policies to each of the sub-components individually. The policy may include one or more rules, with each rule concerning a specific class of violations. Classes of violations include, for example, violations concerning the envelope of the message, violations concerning properties of message sub-components (e.g., attachment type, attachment file name, attachment size, or the like), and violations concerning the text of message sub-components (e.g., presence of specific keywords, regular expressions and expression patterns, presence or absence of certain data from a tabular data source, or the like). The detection engine 128 is able to detect confidential information whether it was data in contained in a file (e.g., word processing file, PDF file, or the like), in an email message, or the like. The detection engine 128 is also able to detect binary matches of graphics and media files, file metadata (such as file type). If the detection engine 128 determines that the text of the message sub-component violates the policy, the detection engine 128 stores data pertaining to the violation in the data violation repository. Data pertaining to the violation may include, for example, message fragments that triggered the policy violation, violated rule(s) of the policy, and data identifying the message component (e.g., a file attachment name, message body, or the like). In one embodiment, the violation is reported via a user interface. In other embodiments, the violation is reported using a structured output format such as XML, PDF, automated email or webmail, SNMP format, or the like. In one embodiment, the reporting tool reports each detected violation by highlighting message fragments containing prohibitive information on the screen or in the report. For rules concerning characteristics of the entire message or attachment, the reporting tool may highlight the characteristic that triggered the violation and specify the policy and/or rule triggered. For rules specifying keywords or regular expression patterns, the reporting tool may highlight keywords or an expression from the message that triggered the violation, specify the message component containing those keywords or expression, and specify the policy and/or rule triggered.

By reporting policy violations, an organization can, for example, identify broken business processes in storing confidential data, such as storing non-encrypted customer information, storing credit card numbers in violation of PCI compliance, storing Social Security numbers out of the organization to ensure state privacy law compliance, storing confidential product plans, or the like. Also, by reporting policy violations, an organization can remedy broken business processes, such as by automatically encrypting exposed confidential data, automatically generating email notifications to educate employees on policies to protect confidential data. Alternatively, other types of actions may be performed in response to detecting a policy violation. By automatically detecting the policy violations regardless of where the confidential data is stored or the structure of the stored confidential data, a highly automated and efficient remediation may be used to protect the confidential data. Also, by automatically detecting the policy violations, data loss risk can easily be measured, as well as managed.

Figure 5:
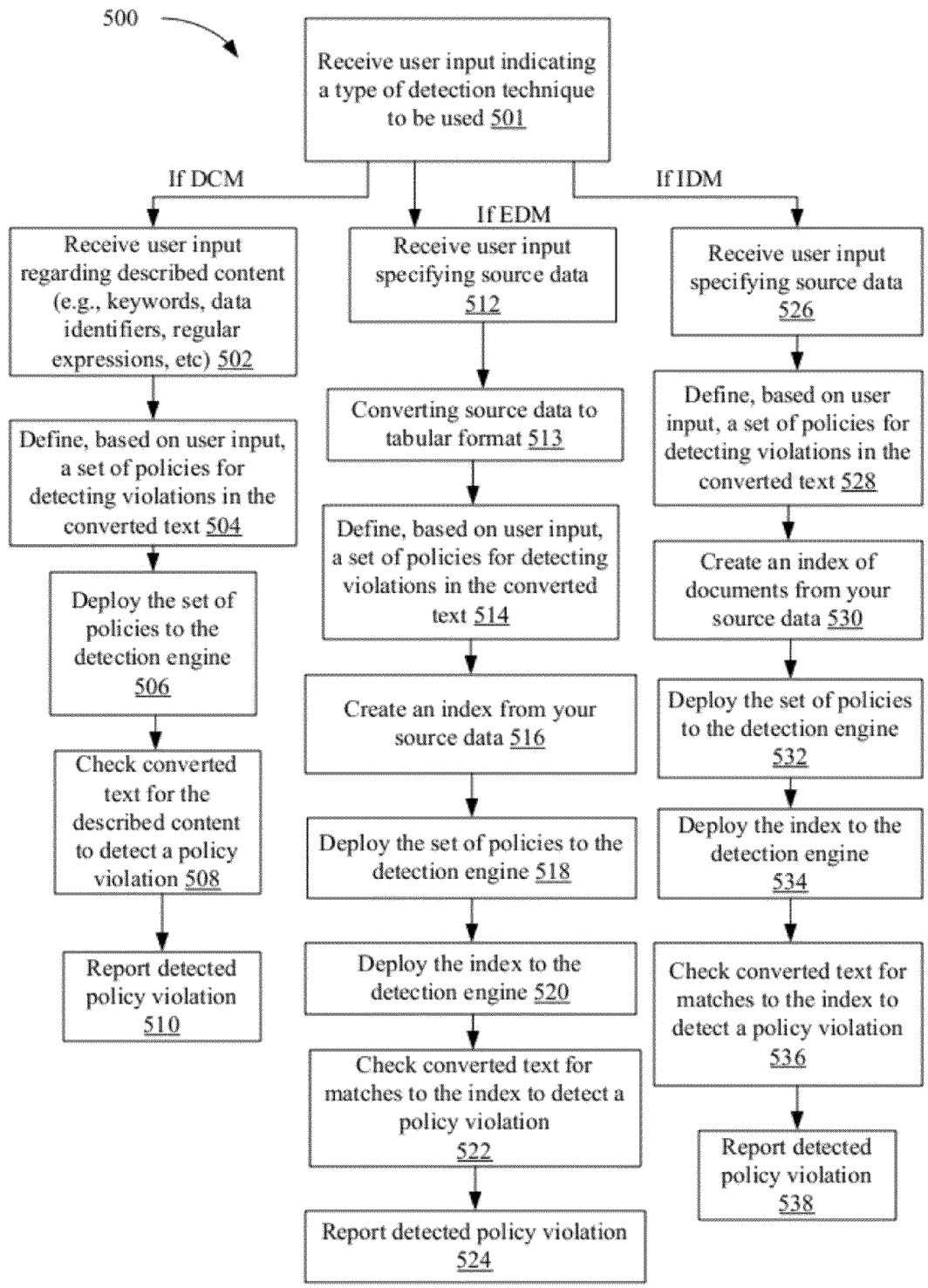
FIG. 5 is a flow diagram of one embodiment of a method for detecting a policy violation in a data repository.

FIG. 5 is a flow diagram of one embodiment of a method 500 for detecting a policy violation in a data repository. The method is performed by processing logic that may comprise hardware (circuitry, dedicated logic, or the like), software (such as is run on a general purpose computer system or a dedicated machine), or a combination of both. In one embodiment, the method is performed by a policy violation detection system (e.g., system 100 of FIG. 1).

Processing logic begins with receiving user input indicating a type of detection technique to be used (block 501). The user input may be received via a user interface allowing a user to select the type of a desired detection technique when the user provides parameters of a policy to be applied to a target data repository. Exemplary types of detection techniques may include DCM, EDM, and IDM. Alternatively, various other detection techniques may be used to detect policy violations in the target data repository.

The DCM detection technique may include various types of detections methods to detect confidential data stored in the data repository, such as keywords, regular expressions, file attributes (such as file type, name, or size), name-value pairs, such as sender and recipient data, lexicons, pattern matching, contextual validation, file attribute information, and message attribute information. The DCM detection technique may also include data identifiers, which use patterns and pattern validators to detect specific numerical data types, such as Social Security numbers. The DCM detection algorithm may detect all types of data in cases where it is impossible or impractical to fingerprint the information to be protected. The DCM detection algorithm may use a combination of lexicons, pattern matching, contextual validation, and file and message attribute information to find confidential data. It should also be noted that any of these detection methods of DCM may be implemented in a policy together with EDM or IDM.

Data identifiers may be used to detect a wide variety of numerical data types, from Social Security numbers to credit card numbers. Data identifiers include data patterns and specific pattern validators. The credit card Data Identifier, for example, detects numbers that match specific credit card patterns and that match a validator (e.g., a mathematical algorithm performed on the first 15 digits of the number that equals the $16^{th}$ digit). The Data Identifiers may include fuller pattern matching and pattern elevators and may run faster than regular expressions. Regular expressions, however, may be useful for data types for which there are no Data Identifiers, such as internal account numbers, and for data types that vary greatly in length, such as email addresses. Keyword matching may be performed to check the converted text for matches. In addition to the types of detection algorithms of DCM, other detection algorithms may be used in the detection rules, such as detection algorithms that specify patterns for name-value pairs, sender and recipient identity, the sites or name of a file or attachment, the attachment type, or the like.

Figure 6:
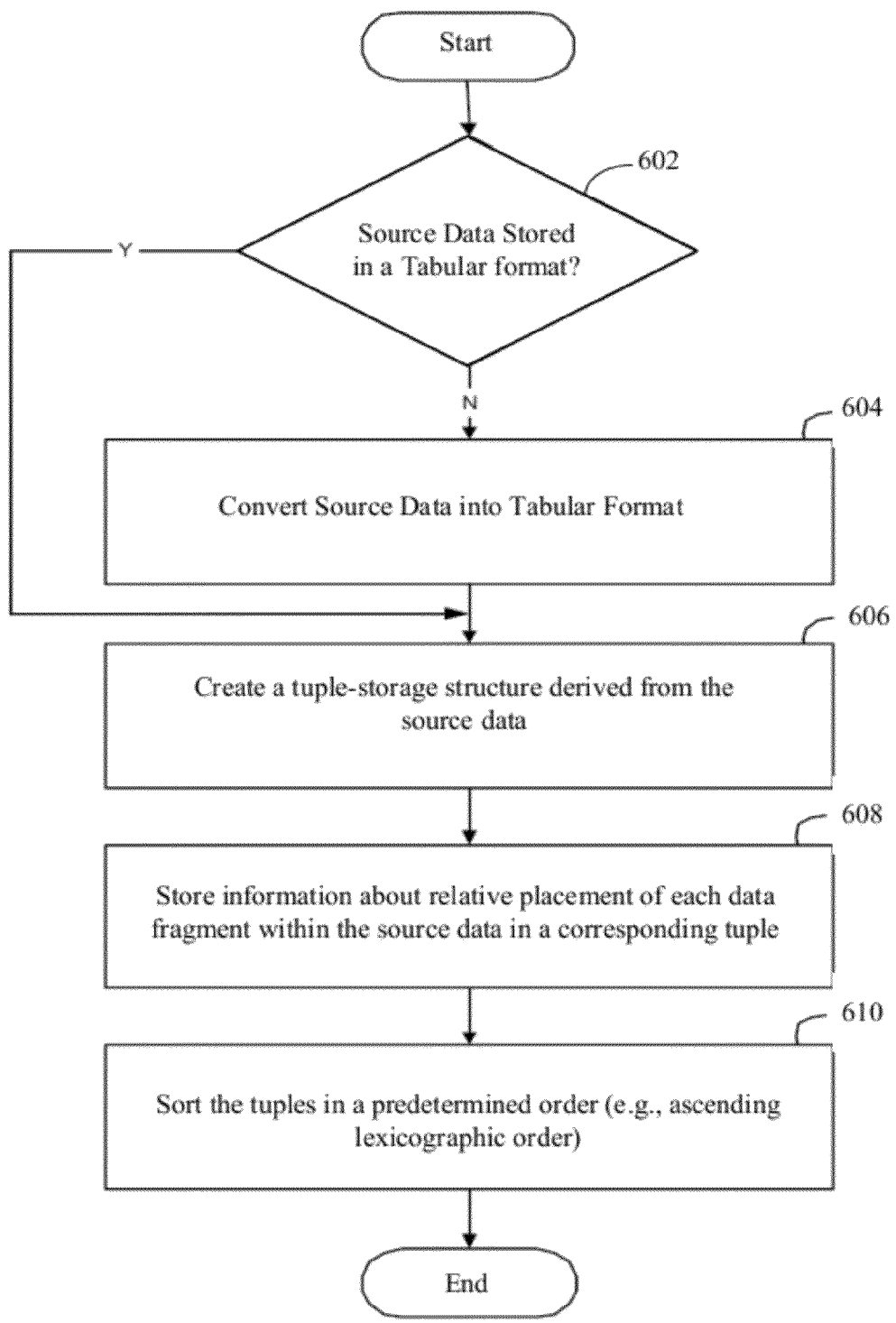
FIG. 6 is a flow diagram of one embodiment of a method for indexing source data.
Figure 7:
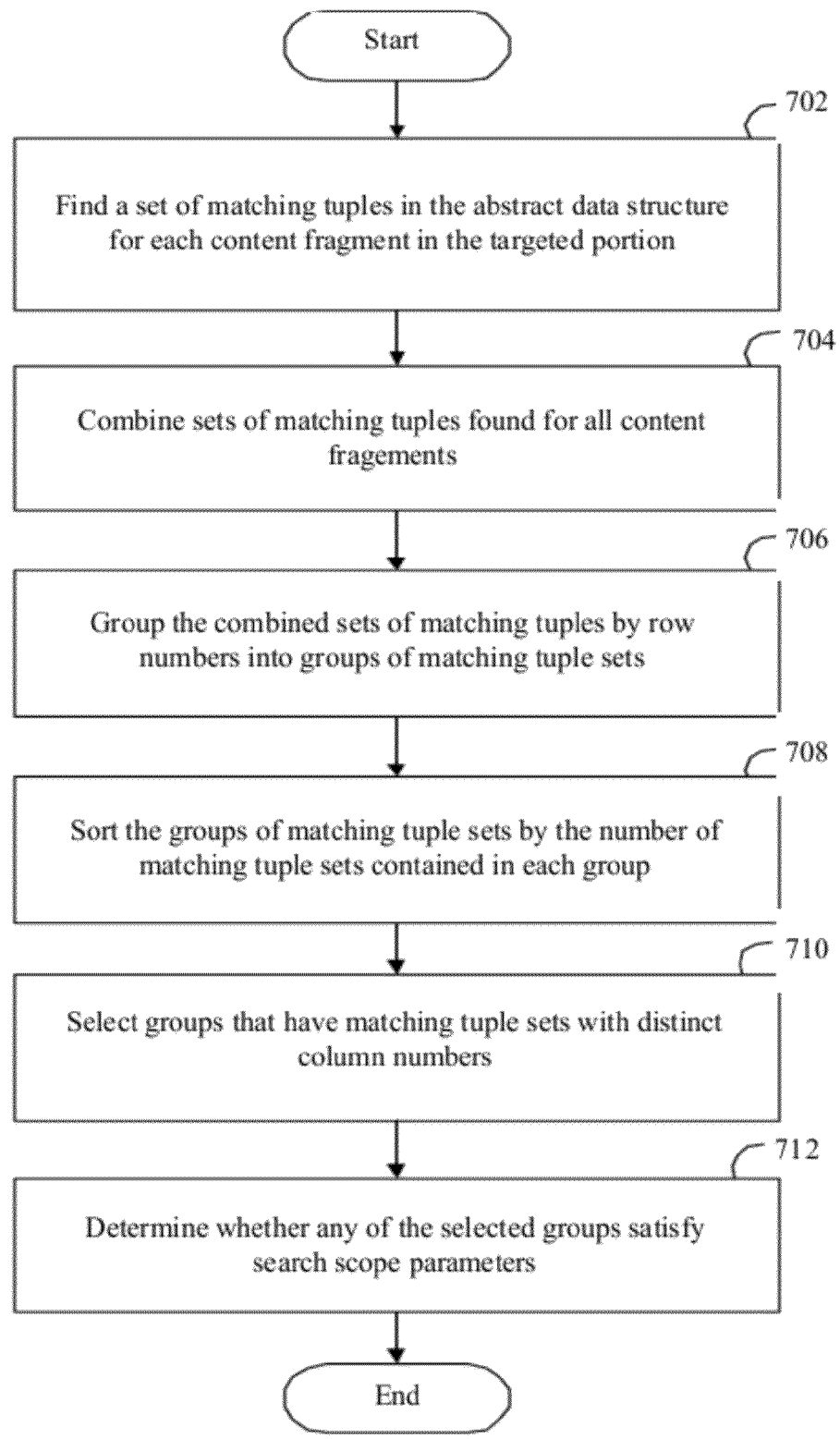
FIG. 7 is a flow diagram of one embodiment of a method for finding a match for a subset of content fragments in an abstract data structure derived from source data.

The EDM detection algorithm may detect structured data; that is, data from databases and other tabular formats. Structured data may include, for example, customer, employee, patient, pricing information, or the like. EDM detection algorithm may allow a policy authors to manage fingerprints of protected data to be matched against information that is copied, stored, or sent. The EDM detection algorithm can find entire records (rows), partial rows, or individual cells of data that are inappropriately exposed. The EDM detection algorithm can detect matches when it detects pieces of data individually (such as an employee Social Security number) or in combination with other data fields from that particular record (such as an employee Social Security number when it appears within the employee's first and last name). In using EDM, a secure fingerprint, or index, from the source data (e.g., employee database) can be created and then references in a detection rule in one or more policies. FIG. 6 illustrates one embodiment for creating an index of the source data to be compared against the converted text. FIG. 7 illustrate one embodiment for finding a match in the converted text using the index. Alternatively, other techniques known in the art may be used to create an index of the source data and/or to match the converted text.

The IDM detection algorithm may detect unstructured data from documents stored in file systems or other document repositories. The unstructured data may include, for example, design plans, source code, CAD drawings, financial reports, and any other sensitive or proprietary information stored in documents. IDM detection algorithm may allow policy authors to manage fingerprints of protected documents to be matched against information that is copied, stored, or sent. The IDM detection algorithm can find full binary matches of documents or partial matches including extracts, versions, or derivatives.

If the received input indicates the detection type as DCM, the processing logic receives (block 502) user input regarding the described content (e.g., keywords, data identifiers, regular expressions (Regexes), file attributes, name-value pairs, pattern matching, or the like). Next, the processing logic defines, based on the user input, a set of policies for detecting the described content in the converted text from the target data repository (block 504). For example, the policy may include rules requiring that the converted text (e.g., in the form of a message) contain a specific keyword(s) or an expression matching a specific regular expression pattern. In one embodiment, the rules in the policy are combined using logical connectives of first-order logic (e.g., AND, OR, NAND, NOR, NOT, equivalent, nonequivalent, or the like). The processing logic then deploys the set of policies to the detection engine 128 (block 506). Next, the processing logic searches the converted text for the described content to detect a policy violation (block 508). Upon detecting a policy violation, processing logic reports the violation (block 510). In one embodiment, processing logic reports the violation by specifying the fragments of the content that triggered the policy violation. In another embodiment, the processing logic reports the violation by identifying a location of the data that triggered the policy violation (e.g., the location of the target database and the column name).

If the receive input indicates the detection type as EDM, the processing logic receives user input specifying source data that includes sensitive information whose presence in the target data repository should trigger a policy violation (block 512). The user input may also identify parameters concerning the source data (e.g., specific columns of the source data, the minimum number of columns of the source data, the minimum number of rows of the source data, or the like). The source data may be any data whose relationships allow it to be structured in a tabular format. Next, the processing logic converts the source data into a standard tabular format (block 513, if not already in a tabular format. Further, the processing logic defines, based on the user input, a set of policies for detecting violations in the converted text (block 514). For example, the policy may include a rule requiring that a message include fragments matching information from specific columns of any single row within the source data. In addition, the set of rules specifying components of the source data may include other requirements with respect to message fragments matching information from the source data. Next, the processing logic creates an index from the source data (block 516). In one embodiment, the index may be a secure file or set of files containing hashes of the exact data values from each filed in the data source, along with information about those data values. The index may be configured to not contain the data values themselves for further security. The processing logic then deploys the set of policies to the detection engine 128 (block 518), and deploys the index to the detection engine 128 (block 520). Next, the processing logic searches the converted text for matches to the index to detect a policy violation (block 522). Upon detecting a policy violation, processing logic reports the violation (block 524).

If the receive input indicates the detection type as IDM, the processing logic receives user input specifying source data (block 526). The source data may be sensitive documents, such as proprietary software code, research specifications, and merger and acquisition documents. Next, the processing logic defines, based on the user input, a set of policies for detecting violations in the converted text (block 528). For example, the policy may include a rule requiring that a message include an entire document or a section of the document matching information from the source data. Next, the processing logic creates an index from the source data (block 530). In one embodiment, the index may be a secure file or set of files containing hashes of text passages from one or more source documents. Collectively, the hashes for a single document may be called the document fingerprint. The index may be configured to not contain the actual document content for further security. The processing logic then deploys the set of policies to the detection engine 128 (block 532), and deploys the index to the detection engine 128 (block 534). Next, the processing logic checks the converted text for matches to the index to detect a policy violation (block 536). In one embodiment, the set of hashes, referred to collectively as a fingerprint, are compared to the converted text to detect either an exact match or a partial match. An exact match may mean that the exact file (e.g., .gif, .mpg, .avi files, or the like) was detected. A partial match may mean that part of the index text of one of the source documents was detected. Upon detecting a policy violation, processing logic reports the violation (block 524).

As discussed above, violations are detected by searching information content using predefined policies according to one of the detecting techniques. In one embodiment, a search is performed using an abstract data structure (index) derived from source data (e.g., EDM). In one embodiment, this index contains no copies of the source data, or contains only encrypted or hashed copies of the source data. This embodiment specifically avoids storing any representation of the data itself so that, in the case of a hacker breaking into the host that runs the DMS 108 (which utilizes the index when performing content searches as discussed above), the data that is exposed to theft is inconsequential. The index may be created using a tuple-storage mechanism that provides a data structure for storing multiple tuples associated with fragments of the database data. Examples of the tuple-storage mechanism include a hash table, a vector, an array, a tree, a list, or a table in a relational database management system. In the process described below, the data stored in the indices only retains the relative placement of the elements in the database in relation to other elements. For example, in the case of a hash table, the index may store, for each fragment of the database data (e.g., a data fragment inside a database cell), the fragment's hash code together with its row number, column number and type of the column. In another embodiment, indices contain fragments of the intellectual property that is under protection, thus reducing the value of the solution by exposing that information to security threats.

In yet another embodiment, copies of a small amount of frequently used strings and numbers from the database that represent a large proportion of the data in the system is still stored directly in the index along with the rest of the information on relative placement of data in the database table(s). This is done by storing copies of these common strings themselves, instead of hash codes. As a result, indices may include the row numbers, column numbers, and type of the source data, but instead of storing a hash code, the index stores the string itself. For the rest of the cells of the database which are not quite so common, only the row numbers, column numbers, and type of the source data are stored, while specifically not storing copies of these strings. This approach uses the fact that the statistical distribution of string and numeric data in databases is often skewed so that the most common terms account for a very large percentage of the overall volume of data stored. Storing these common terms in a separate index helps index query efficiency since the small number of common terms accounts for a large proportion of the queries, and these queries can be run using standard quick techniques from the literature (e.g., hash table lookups, bitmaps, or the like). The reason that this is not a security vulnerability is that the small number of terms, which account for a disproportionate share of volume of source data, are the least valuable pieces of data. The terms "John" and "Smith" are very common inside databases that contain names, but the theft of these terms is relatively worthless. In this embodiment, the system is still carefully avoiding storing copies of data of less-common terms of higher value (e.g., credit card numbers, SSN, uncommon names, or the like).

FIG. 6 is a flow diagram of one embodiment of a method for indexing the source data. The method is performed by processing logic that may comprise hardware (circuitry, dedicated logic, or the like), software (such as is run on a general purpose computer system or a dedicated machine), or a combination of both. In one embodiment, the method is performed by a policy management system (e.g., PMS 104 of FIG. 1).

Referring to FIG. 6, processing logic begins with determining whether the source data is stored in a standard tabular format (processing box 602). If not, processing logic converts the source data into a standard tabular format (block 604). Each cell in the resulting table stores a fragment of the source data. In one embodiment, each data fragment is a token. A token may be a single word or a cluster of words (e.g., words enclosed in quotation marks). For example, while the word "this" may represent a token stored in a database cell, the phrase "this token" may also represent a standalone token if it is stored as a single string in a database cell.

Next, processing logic creates a tuple-storage structure derived from the source data (block 606). A tuple-storage structure provides a mechanism for storing multiple tuples associated with the fragments of the source data. Examples of tuple-storage structures include a hash table, a vector, an array, a tree, or a list. Each type of the tuple-storage structure is associated with a method for retrieving a set of tuples for any given content fragment (the set of tuples may be empty if no match is found in the tuple-storage structure).

Further, processing logic stores information about the position of each data fragment within the source data in a corresponding tuple (block 608). In one embodiment, the information about the position of a data fragment includes the number of a row storing the data fragment in the source data. In another embodiment, this information also includes the number of a column storing the data fragment in the source data and optionally the data type of the column.

Afterwards, processing logic sorts the tuples in a predetermined order (e.g., in the ascending lexicographic order) (block 610).

Thus, the resulting abstract data structure (i.e., the index) only contains information about the relative placement of data records in the context of the larger whole but does not include any fragments of the source data itself.

In one embodiment, the contents of the index are treated cryptographically (e.g., with a hash function or using an encryption function with a cryptographic key) to further secure the index from theft.

FIG. 7 is a flow diagram of one embodiment of a method to find, for a subset of content fragments, a match satisfying policy parameters in an abstract data structure derived from source data. The method is performed by processing logic that may comprise hardware (circuitry, dedicated logic, or the like), software (such as is run on a general purpose computer system or a dedicated machine), or a combination of both. In one embodiment, the method is performed by a data monitoring system (e.g., DMS 108 of FIG. 1).

Referring to FIG. 7, processing logic begins with parsing the converted text (e.g., sequence of content fragments) into content fragments (e.g., tokens). Then, for each content fragment, processing logic searches the abstract data structure for a set of matching tuples (block 702). For example, a word "Smith" contained in the information content may have several occurrences in the source data that are reflected in the abstract data structure. Specifically, each of these occurrences has a corresponding tuple in the abstract data structure. During the search, processing logic retrieves a set of tuples corresponding to the occurrences of the word "Smith" in the source data. Each tuple stores information about the position of this data fragment within a database or a table storing the source data. In one embodiment, the positional information includes the row number of a cell storing the data fragment. In another embodiment, the positional information also includes a column number of this cell and optionally the data type of the column.

Next, processing logic combines the matching tuple sets found for all the content fragments (block 704) and then groups the combined matching tuple sets by row numbers into groups L (block 706). As a result, each group L (referred to herein as an accumulator) contains matching tuple sets that all have the same column number, i.e., the matching tuple sets in each group L correspond to fragments of the source data that all appear to be from the same row in the database.

Further, processing logic sorts the groups L by the number of matching tuple sets contained in each group (block 708) and, in one embodiment, selects those groups that have tuple sets with distinct column numbers (block 710). Afterwards, processing logic determines whether any of the selected groups satisfy policy parameters (block 712).

Although FIGS. 6-7 describe various embodiments for EMD, including indexing source data, searching information content for source data, finding matching for a subset of content fragments in an abstract data structure derived from source data, and searching an incoming message using a hash table index of source data, alternatively, the detection engine 128 may use other various techniques to detect whether the stored message contains a policy violation. For example, the detection engine may use IDM techniques, DCM techniques, including keyword searches, data identifiers, pattern matching, or other detection techniques known by those of ordinary skill in the art.

Figure 8:
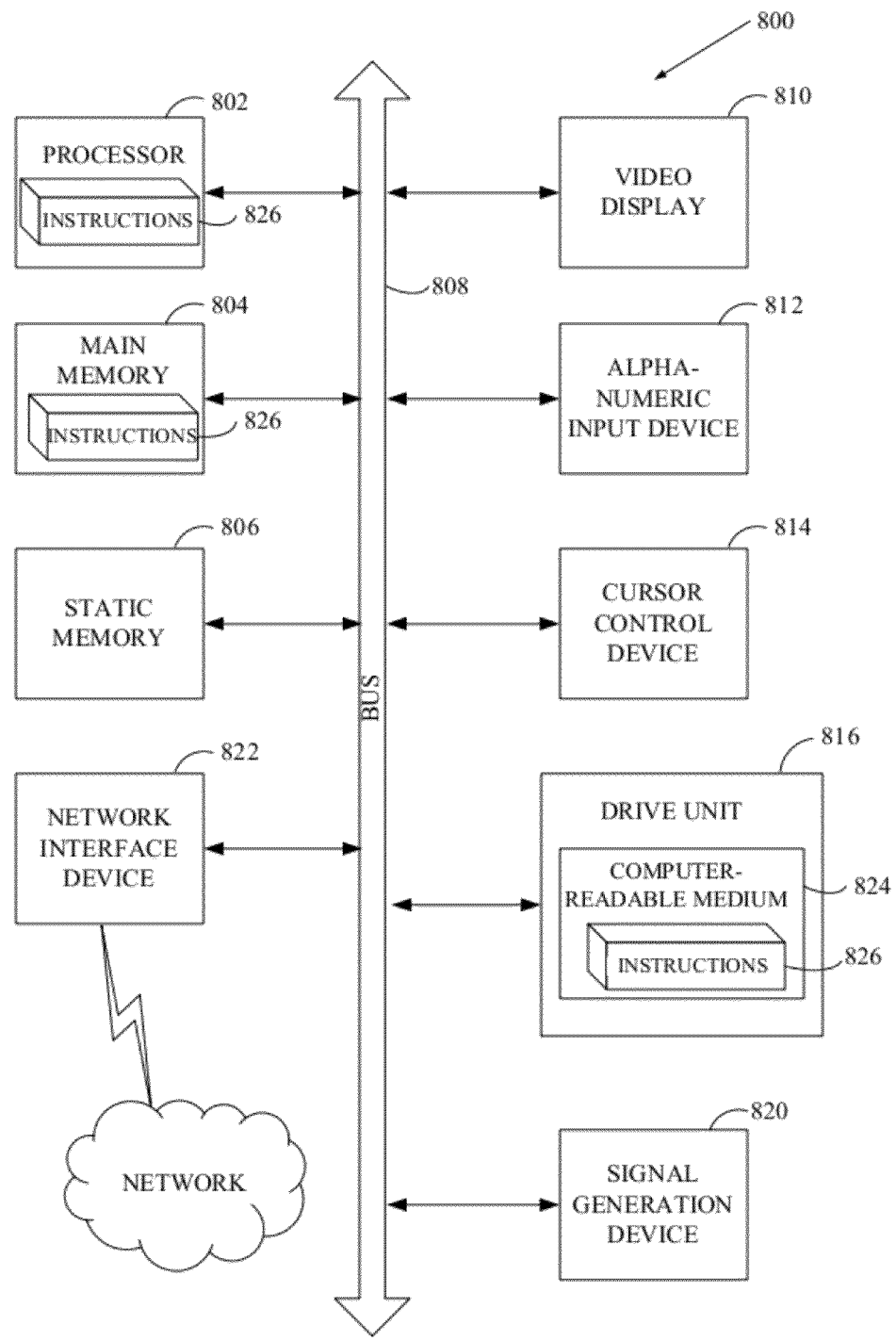
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The embodiments described herein allow organizations to discover exposed confidential data stored in various types of content management systems and databases, regardless of the data schema used by the various types of content management systems and databases, and without prior knowledge of the particular data schemas. Once the exposed confidential data is discovered, the exposed confidential data may be quickly located and fixed. The embodiments described herein may be implemented in a centralized platform for data loss policy management, detection, workflow, and remediation that enables organizations to define policies once and enforce them across the enterprise. The embodiments described herein may be used to help companies address Payment Card Industry Data Security (PCI DSS) compliance, e-Discovery, data classification, and data governance objectives.

The embodiments described herein may be used in various scenarios, for example, to scan servers (e.g., Microsoft Sharepoint® server) and databases (e.g., SQL databases) to determine if they contain social security numbers and credit card numbers. Other examples may include protecting confidential marketing plans and campaign schedules from being shared on an open file shares, quickly responding to e-Discovery requests, protecting against a user from posting internal product pricing lists on a partner web portal, and scanning stored data for compliance violations, such as for the Gramm-Leach-Bliley Act (GLBA), Health Insurance Portability and Accountability Act (HIPAA), PCI, or state data privacy laws, or the like. In addition, the embodiments described herein may be used to identify aged or outdated confidential documents unnecessarily stored in unexpected places within the organization to gain visibility into where confidential data is stored throughout the enterprise, to complete an inventory of which data repositories store confidential data by user, department, or policy, to reduce proliferation of confidential data across file servers, document and email repositories, web content and applications, and databases, to provide highly automated and efficient remediation, and to easily manage and measure data loss risk.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium may include, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable storage medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. A computer-implemented method, comprising:
   identifying, by a computer system, structured data stored in a data repository having an arbitrary data schema, the arbitrary data schema of the data repository being unknown;
   scanning the structured data of the data repository;
   converting the structured data into text data; and
   applying a schema-independent policy to the converted text data to detect confidential information stored in the data repository regardless of the arbitrary data schema of the structured data, wherein the schema-independent policy is a data loss prevention policy, and wherein a policy violation is triggered when the converted text data contains confidential information.

2. The method of claim 1, wherein applying the data loss prevention policy comprises detecting confidential data that is otherwise hidden in the data repository due to the arbitrary data schema of the data repository.

3. The method of claim 1, wherein scanning the structured data comprises identifying the structured data as containing one of text, numbers, or binary data, and wherein converting the structured data comprises converting the text, numbers, or binary data into text data.

4. The method of claim 1, wherein scanning the structured data further comprises:
   analyzing the arbitrary data schema to determine logical units of data of the data repository;
   reading the structured data by the logical units of data; and
   generating a message containing the converted text data that is read from the data repository.

5. The method of claim 1, wherein scanning the structured data further comprises:
   querying the data repository to derive the arbitrary data schema of the data repository;
   reading data from the data repository according to the derived data schema; and
   generating a message containing the converted text data that is read from the data repository.

6. The method of claim 5, further comprising sending the message to a detection engine to detect whether there is a policy violation in the message by applying the schema-independent policy to the converted text data of the message.

7. The method of claim 5, further comprising receiving user input concerning the data repository to which to apply the policy.

8. The method of claim 7, wherein receiving the user input comprises at least one of a connect string that includes information about how to connect to the data repository, credentials for the data repository, or vendor information for the data repository from the user.

9. The method of claim 7, further comprising receiving a query from the user to query specific information from the data repository.

10. The method of claim 1, wherein the data repository is a database, and wherein scanning the structured data comprises:
    connecting to the database using a connect string;
    query a set of table names of the database;
    for each table, read column names of table;
    for each table, identify each column in database as one of text, numbers, or binary data; and
    for each row in the table, read all cells in that row.

11. The method of claim 10, further comprising:
    for each row in the table, constructing a text block containing the column names, text of cells that are in text, text representation of cells that are numbers;
    for each row in the table, creating a message containing the constructed text block and the binary data from each cell containing binary data, if any; and
    for each row in the table, sending the message to a detection engine that detects whether there is a policy violation in the message by applying the policy to the converted text data of the message.

12. The method of claim 11, wherein creating the message further comprises converting the cell containing binary data into text data, and wherein the converted text data remains associated with the message.

13. The method of claim 1, further comprising reporting the policy violation when detected, wherein reporting the policy violation comprises identifying a location of the structured data that triggered the policy violation.

14. An apparatus, comprising:
    a data repository having an arbitrary data schema; and
    a scan agent, coupled to the data repository, to access data stored in the data repository, to derive the arbitrary data schema of the data repository, the arbitrary data schema of the data repository being unknown, to scan the data of the data repository, and to convert the data of the data repository into text data to allow application of a schema-independent policy to the converted text data of the data repository to detect confidential data stored in the data repository regardless of the arbitrary data schema of the structured data, wherein the schema-independent policy is a data loss prevention policy, and wherein a policy violation is triggered when the converted text data contains confidential information.

15. The apparatus of claim 14, wherein the scan agent is further to identify the data as containing one of text, numbers, or binary data, and to convert the text, numbers, or binary data into text data, and to generate a message containing the converted text data and send the message to a detection engine to detect whether the message contains confidential data.

16. The apparatus of claim 14, further comprising the detection engine, coupled to the scan agent, to apply the data loss prevention policy to the converted text data of the message to detect whether the message contains confidential data, wherein the data loss prevention policy is a schema-independent policy.

17. A computer-readable storage medium having instructions stored thereon that when executed by a computer cause the computer to perform a method, comprising:

identifying, by a computer system, structured data stored in a data repository having an arbitrary data schema, the arbitrary data schema of the data repository being unknown;

scanning the structured data of the data repository;

converting the structured data into text data; and applying a schema-independent policy to the converted text data to detect confidential information stored in the data repository regardless of the arbitrary data schema of the structured data, wherein the schema-independent policy is a data loss prevention policy, and wherein a policy violation is triggered when the converted text data contains confidential data.

18. The computer-readable storage medium of claim 17, wherein applying the data loss prevention policy comprises detecting confidential data that is otherwise hidden in the data repository due to the arbitrary data schema of the data repository.

* * * * *